US009180611B2

(12) United States Patent
Yonesato et al.

(10) Patent No.: US 9,180,611 B2
(45) Date of Patent: Nov. 10, 2015

(54) COMPRESSION-FORMING SYSTEM (75) Inventors: Jun Yonesato, Yokohama (JP);
Taketoshi Manou, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 14/006,073

(22) PCT Filed: Feb. 2, 2012

(86) PCT No.: PCT/JP2012/052388
§ 371 (c)(1),
(2), (4) Date: Sep. 18, 2013

(87) PCT Pub. No.: WO2012/132543
PCT Pub. Date: Oct. 4, 2012

(65) Prior Publication Data
US 2014/0010906 A1 Jan. 9, 2014

(30) Foreign Application Priority Data
Mar. 29, 2011 (JP) ................... 2011-073240

(51) Int. Cl.
*B29C 43/34* (2006.01)
*B29C 43/04* (2006.01)
*B29C 43/08* (2006.01)
*B29C 43/58* (2006.01)
(Continued)

(52) U.S. Cl.
CPC .............. *B29C 43/34* (2013.01); *B29C 43/04* (2013.01); *B29C 43/08* (2013.01); *B29C 43/58* (2013.01); *B29B 11/12* (2013.01); *B29C 2043/3466* (2013.01); *B29C 2049/028* (2013.01)

(58) Field of Classification Search
CPC ........ B29C 43/34; B29C 43/04; B29C 43/08; B29C 43/58; B29C 2049/028; B29C 2043/3466
USPC ............... 425/143, 144, 412, 418, 436 R
See application file for complete search history.

(56) References Cited

U.S. PATENT DOCUMENTS 2,813,303 A * 11/1957 Stevenson et al. ............ 425/350
5,234,646 A * 8/1993 Tanino et al. ................. 264/120
(Continued)

FOREIGN PATENT DOCUMENTS

JP 2005-059239 A 3/2005
JP 4356066 A 5/2005
(Continued)

OTHER PUBLICATIONS

Machine translation of JP2005-59239, Jun. 26, 2014, 11 pages.*

*Primary Examiner* — Yogendra Gupta
*Assistant Examiner* — Emmanuel S Luk
(74) *Attorney, Agent, or Firm* — Sughrue Mion, PLLC (57) ABSTRACT A compression-forming system comprising a molten resin mass-feeding device equipped with the holding portions for holding the molten resin masses, a compression-forming machine equipped with the metal molds, and a molten resin mass position detector, wherein said molten resin mass position detector is a temperature sensor, and said temperature sensor measures the temperature of a portion on the outer side of an allowable range in which the molten resin masses are fed to the metal molds, and judges the presence of the molten resin masses on said portion by the temperature of said portion of the metal molds to detect that the molten resin masses are defectively handed over.

3 Claims, 6 Drawing Sheets (51) Int. Cl.
    *B29B 11/12*    (2006.01)
    *B29C 49/02*    (2006.01)

(56) References Cited

U.S. PATENT DOCUMENTS

| | | | | |
|---|---|---|---|---|
| 6,042,754 | A * | 3/2000 | Yang et al. | 264/1.1 |
| 7,425,293 | B2 * | 9/2008 | Parrinello et al. | 264/255 |
| 7,713,469 | B2 * | 5/2010 | Schmidt et al. | 419/49 |
| 7,967,593 | B2 | 6/2011 | Takano et al. | |
| 8,007,266 | B2 | 8/2011 | Parrinello et al. | |
| 8,153,048 | B2 | 4/2012 | Imatani et al. | |
| 8,673,190 | B2 * | 3/2014 | Sowden et al. | 264/109 |
| 2002/0175445 | A1 * | 11/2002 | Gruau et al. | 264/248 |
| 2003/0124183 | A1 * | 7/2003 | Sowden | 424/464 |
| 2007/0007694 | A1 | 1/2007 | Nemoto et al. | |
| 2007/0196531 | A1 | 8/2007 | Parrinello et al. | |
| 2008/0038395 | A1 * | 2/2008 | Nicol | 425/170 |
| 2009/0014915 | A1 * | 1/2009 | Asano et al. | 264/330 |
| 2012/0074614 | A1 * | 3/2012 | Sowden et al. | 264/279.1 |
| 2013/0181368 | A1 | 7/2013 | Nemoto et al. | |

FOREIGN PATENT DOCUMENTS

| | | |
|---|---|---|
| JP | 2008-535705 A | 9/2008 |
| JP | 4573175 B2 | 11/2010 |
| WO | 2007/034845 A1 | 3/2007 |

* cited by examiner

Fig. 6 ns to an extruder equipped with an extrusion port, a cutter for cutting the molten resin extruded from the extrusion port into the molten resin masses, and a holder that holds the molten resin masses cut by the cutter, characterized in that the molten resin mass position detector comprises:

COMPRESSION-FORMING SYSTEM

CROSS REFERENCE TO RELATED APPLICATIONS

This application is a National Stage of International Application No. PCT/JP2012/052388 filed Feb. 2, 2012, claiming priority based on Japanese Patent Application No. 2011-073240 filed Mar. 29, 2011, the contents of all of which are incorporated herein by reference in their entirety.

TECHNICAL FIELD

This invention relates to a compression-forming system that detects a molten mass that is handed over to a defective position in handing over the molten resin masses to the metal molds of a compression-forming machine from a molten resin mass-feeding device equipped with the holding portions for holding the molten resin masses obtained by cutting a molten resin extruded from an extrusion port of an extruder.

BACKGROUND ART

Plastic containers obtained by forming a polyethylene terephthalate and the like have been widely put into the practical use as containers for containing beverages. A preform which is a precursor to the plastic container is, usually, formed in an injection-forming machine. In recent years, however, forming has been attempted by using a compression-forming system, and various improvements have been made. In carrying out the compression-forming, the molten resin extruded from the extrusion port of a die head is fed (conveyed) to the compression-forming system in a manner as described below.

The synthetic resin heated and melted in the extruder is extruded from the extrusion port of the die head provided in the extruder and is, thereafter, cut by a cutter of a molten resin mass-feeding (conveying) device that is rotating, and is cut from the extrusion port. The molten resin mass after cut is fed into a holder of a holder unit provided in the molten resin mass-feeding device. The holder unit so moves as to follow up part of the rotary track of the metal mold provided in the compression-forming system. The holder of the holder unit moves the molten mass that is fed to a position over the metal mold, permits it to fall into a forming hole of the metal mold (usually, a female mold) in a section in which it is following up the rotary track so that the molten resin mass is handed over thereto.

The following patent document 1 discloses a compression-forming system inclusive of an extruder, a molten resin cutting/conveying device (molten resin mass-feeding device) and a compression-forming machine.

The following patent document 2 discloses a compression-forming system in which a molten resin mass fed into the female mold of the metal mold is compression-formed by the female mold in cooperation with a male mold provided in the compression-forming system so as to be formed into a preform of a predetermined shape.

PRIOR ART DOCUMENTS

Patent Documents

Patent document 1: Japanese Patent No. 4356066
Patent document 2: Japanese Patent No. 4573175

OUTLINE OF THE INVENTION

Problems that the Invention is to Solve

In the molten resin mass-feeding device of the compression-forming system, however, the frictional force on the surface of the holder that holds the molten resin mass undergoes a change due to accumulation and deposition of oligomer and the like which are the components generating from the molten resin mass. A change in the frictional force on the surface of the holder causes a change in the timing for falling the molten resin mass or in the attitude thereof, and the position for handing over to the metal mold often becomes defective. If the production is continued by the compression-forming machine in this state, the molten resin mass fails to assume a proper shape of preform, and the formed article that is solidified often remains in the metal mold. If the next molten resin mass (drop) is fed into the metal mold and if the metal mold in this state is closed, then the metal mold may break; i.e., the apparatus must be brought to a halt.

To detect such a defective hand-over, so far, it was a generally accepted practice to take a picture of the top panel of the female metal mold by using a camera and process the image, or to detect the presence of an object by installing a sensor in all of the female metal molds to detect the presence of the object. This method, however, requires an expensive facility cost involving difficulty in regard to maintenance and adjustment.

Besides, even if the apparatus could be brought into a halt immediately after having detected the molten resin mass that was defectively handed over, the time was required for removing the remaining molten resin mass or the preform that has solidified during the compression forming before assuming a required shape, making it, therefore, difficult to resume the productive state in an early time, and forcing even those resins at the normally handed over positions that could have been formed into the normal products to be discarded and wasted.

The present invention was accomplished in view of the above circumstances and has an object of providing a compression-forming system equipped with a molten resin detector device which is an inexpensive device capable of detecting the molten resin masses that are defectively handed from the molten resin mass conveyer device over to the metal molds, enabling the production to be quickly resumed after the halt of the apparatus.

Means for Solving the Problems

The present inventors have discovered a common point in that the molten resin mass deviates in a predetermined direction of the compression-forming metal mold in case the molten resin mass is defectively handed from the molten resin mass-feeding device over to the compression-forming machine. Based on this discovery, the inventors have learned that upon installing a single temperature measurement means (radiation thermometer) on a predetermined position to measure a particular portion of the forming metal molds passing along the rotary track, it was made possible to detect every molten resin mass defectively handed over and arranged on the compression-forming machine.

To achieve the above object, the present invention provides a compression-forming system comprising a molten resin mass-feeding device equipped with the holding portions for holding the molten resin masses, a compression-forming machine equipped with the metal molds, and a molten resin mass position detector, wherein the molten resin mass position detector is a temperature sensor, and the temperature sensor measures the temperature of a portion on the outer side of an allowable range in which the molten resin masses are fed to the metal molds, and judges the presence of the molten resin masses on said portion by the temperature of said portion of the metal molds to detect that the molten resin masses are defectively handed over.

It is desired that the temperature sensor in the compression-forming system is an infrared thermometer of the non-contact type.

It is desired that the metal molds in the compression-forming system are conveyed along a circular track, the holding portions are conveyed along a circular track revolving reversely to the metal molds, the holding portions being so conveyed as to hand the molten resin masses over to the metal molds at a portion where the molten resin masses are to be handed over to the metal molds following up the circular track of the metal molds, and the portion where the temperature is to be measured by the temperature sensor is on the outer side of the position of the forming hole of the metal molds in the radial direction of rotation.

In the compression-forming system, it is desired that a control unit discontinues the extrusion of the molten resin from the extrusion port to the holding portions if it is decided that the molten resin mass is on the outer side of the allowable range.

If the feeding to the holding portions is discontinued in the compression-forming system, it is desired that the operation of the compression-forming machine is brought to a halt after the molten resin masses still remaining in the holding portions are all handed over to the metal molds and are formed into a predetermined shape.

Effects of the Invention

According to the compression-forming system of the present invention, the temperature sensor installed at a predetermined position measures the temperature at a predetermined portion of the metal molds making it possible to decide if the molten resins are fed to a normal position in all of the metal molds arranged in the compression-forming machine and to decrease the cost of the facilities. If it is decided that the molten resin masses are on the outer side of the allowable range, the control unit discontinues the extrusion of the molten resin from the extrusion port to the holding portions and discontinues the feeding of the molten resin masses to the holding portions. In this case, the operation of the compression-forming machine is brought to a halt after the molten resin masses still remaining in the holding portions are all handed over to the metal molds and are formed into a predetermined shape, making it easy to remove the formed products from the defectively handed over positions. Upon bringing the operation of the compression-forming machine into a halt after the compression-formed products (e.g., compression-formed preforms, cups, etc.) have been flown to the next step, it is made possible to prevent the molten resin from being wasted.

Subsequent to the molten resin masses that were not fed to the female molds at their normal positions, if it is not desired that the molten resin masses fed to the female molds at their normal positions be formed into products, then they can be easily removed simultaneously.

MODE FOR CARRYING OUT THE INVENTION

Described below with reference to the drawings is a compression-forming system equipped with a molten resin mass detector according to an embodiment of the invention.

Figure 1:
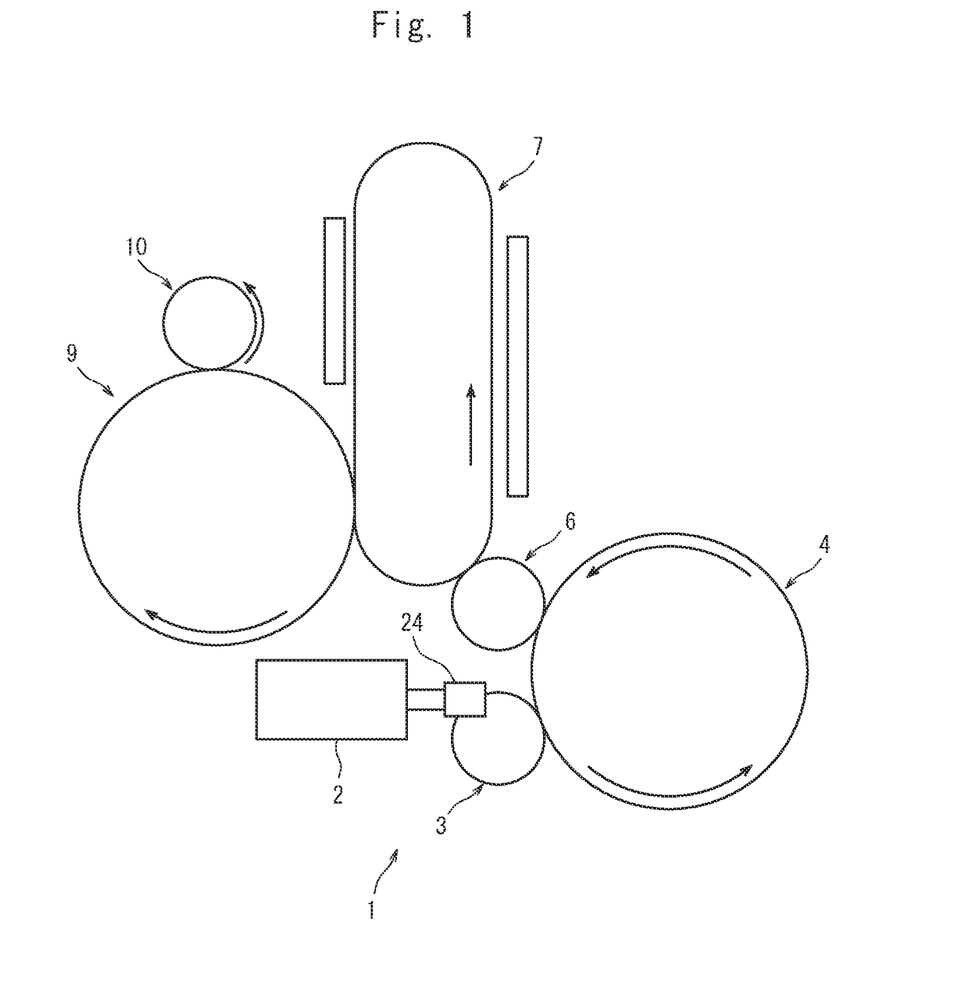
FIG. 1 is a schematic plan view of a compression-forming system equipped with a molten resin mass position detector according to an embodiment of the present invention.
Figure 2:
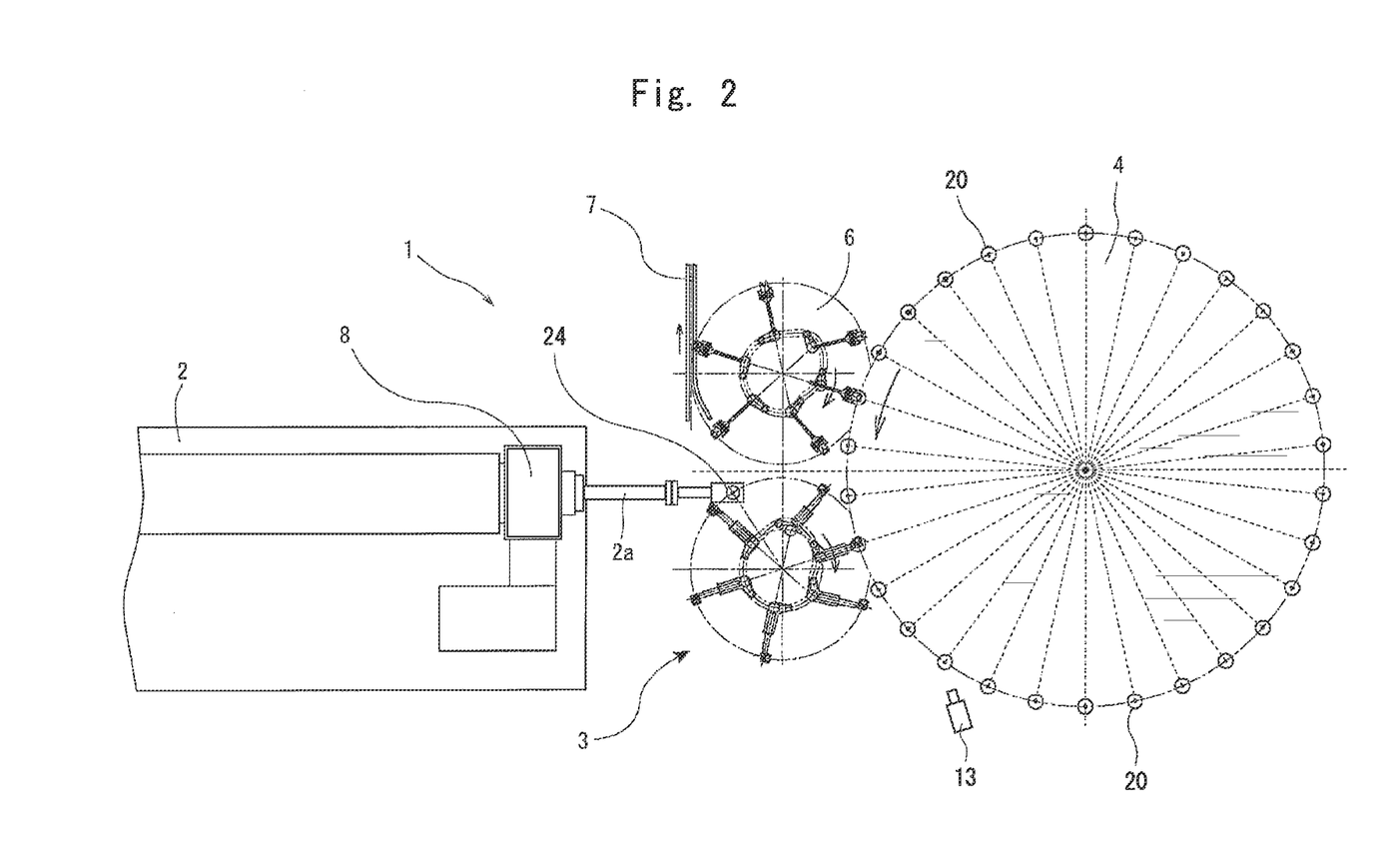
FIG. 2 is a plan view showing an extruder, a molten resin mass-feeding device and a compression-forming machine in the compression-forming system of FIG. 1.

FIG. 1 is a schematic plan view of a compression-forming system that forms a preform of a PET bottle or the like bottle as a product which is also called preform, and, further, conducts the blow-forming, and FIG. 2 is a plan view showing an extruder, a molten resin mass-feeding device and a compression-forming machine in the compression-forming system.

The compression-forming system 1 includes an extruder 2, a molten resin mass-feeding device 3, a compression-forming machine 4, a preform takeout device 6 and a takeout conveyer (PF equalizer) 7, a stretch-blow-forming machine 9, and a product takeout device 10.

The extruder 2 has nearly a cylindrical outer shape and works to heat, melt and knead synthetic resin materials such as polyethylene terephthalate and the like, and conveys the formed molten resin to a screw 8. The ejection port of the screw 8 is connected to a die head 24 via a conduit 2a. The die head 24 has a cylindrical shape in cross section, and the synthetic resin in a molten state is continuously extruded downward from the die head 24 in nearly a cylindrical shape.

Figure 3:
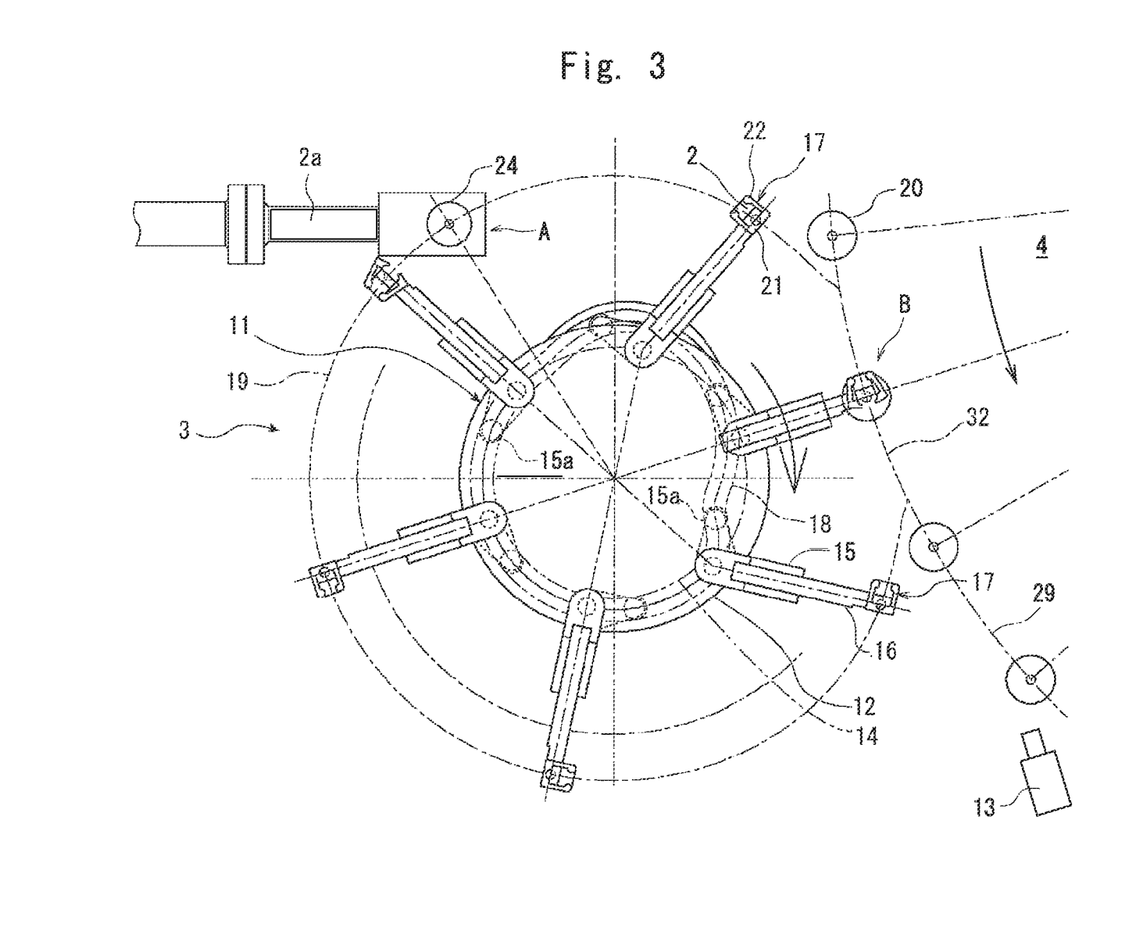
FIG. 3 is an enlarged view showing the periphery of the molten resin mass-feeding device in the compression-forming system of FIG. 1.

The molten resin mass-feeding device 3 shown in FIG. 3 has a cutter wheel 11 which includes a rotary plate 12, a rocker cam 14, rocker units 15, expansion units 16, and holder units 17.

The rotary plate 12 is a disk-like member. In the drawing, six rocker units 15 are arranged to rotate together with the rotary plate 12 being spaced apart at an equal angular distance about the circumference thereof. The rotary plate 12 is rotated clockwise as viewed from above by a motor (not shown) as driving means.

Each rocker unit 15 has a cam follower 15a at the lower part thereof. As the rotary plate 12 rotates, the cam follower 15a moves along an annular groove 18 formed in the rocker cam 14. As viewed on a plane, the annular groove 18 is a deformed curve on the side of the compression-forming machine 4, and is forming a circular track on the side opposite to the compression-forming machine 4.

The expansion unit 16 is a rod-like member extending in nearly the radial direction of the rotary plate 12, and has a holder unit 17 at an end on the outer circumferential side thereof. The expansion unit 16 is provided in the upper part of the rocker unit 15 via a linear bearing or the like to move back and forth in the lengthwise direction of the rocker unit 15. Relying upon, for example, air cylinder, cam, spring, motor or a combination thereof (not shown), the expansion unit 16 reciprocally moves in nearly the radial direction of the rotary plate 12.

The holder unit 17 is provided at an end of the expansion unit 16. Before and after a position B where a molten resin mass 5 is handed over to a female mold (metal mold; male mold has not been shown here) 20 of the compression-forming machine 4, the holder unit 17 moves along a track 29 of the female mold 20. This enables the molten resin mass 5 to be reliably handed over despite the operation is carried out at a high speed.

Figure 4:
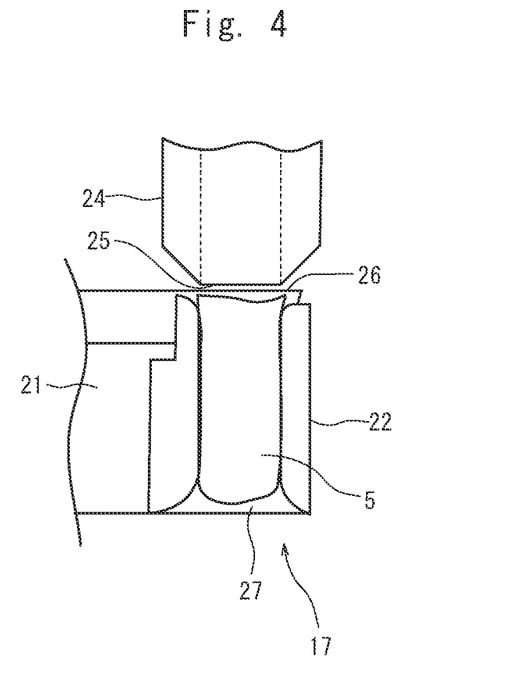
FIG. 4 is an enlarged view of an extrusion nozzle at an end of the extruder in FIG. 1.

FIG. 4 shows a major portion of the holder unit 17 as viewed from a position A in direction of rotation. The holder unit 17 includes a base portion 21, a pair of holders 22, and a cutter 26. If closely described, the base portion 21 is provided at its upper portion with the cutter 26 that protrudes upward and tilted in the direction of rotation. The base portion 21, further, has the holders 22 that can be freely opened and closed. The holders 22 form a holding portion 27 for holding the molten resin mass 5; i.e., in the holding portion 27, the molten resin mass 5 cut by the cutter 26 is stored being held by the holders 22. The holder unit 17 conveys the molten resin mass 5 that is cut and, when it has reached over the female mold 20, opens the holders 22 so that the molten resin mass 5 falls down on the female mold 20 positioned on the lower side.

The female mold 20 of the compression-forming machine 4 rotates along a circular track in the direction opposite to the direction of rotation of the holder units 17 of the molten resin mass-feeding device 3. A plurality of female molds 20 are arranged maintaining an equal distance along the rotary track.

Figure 5:
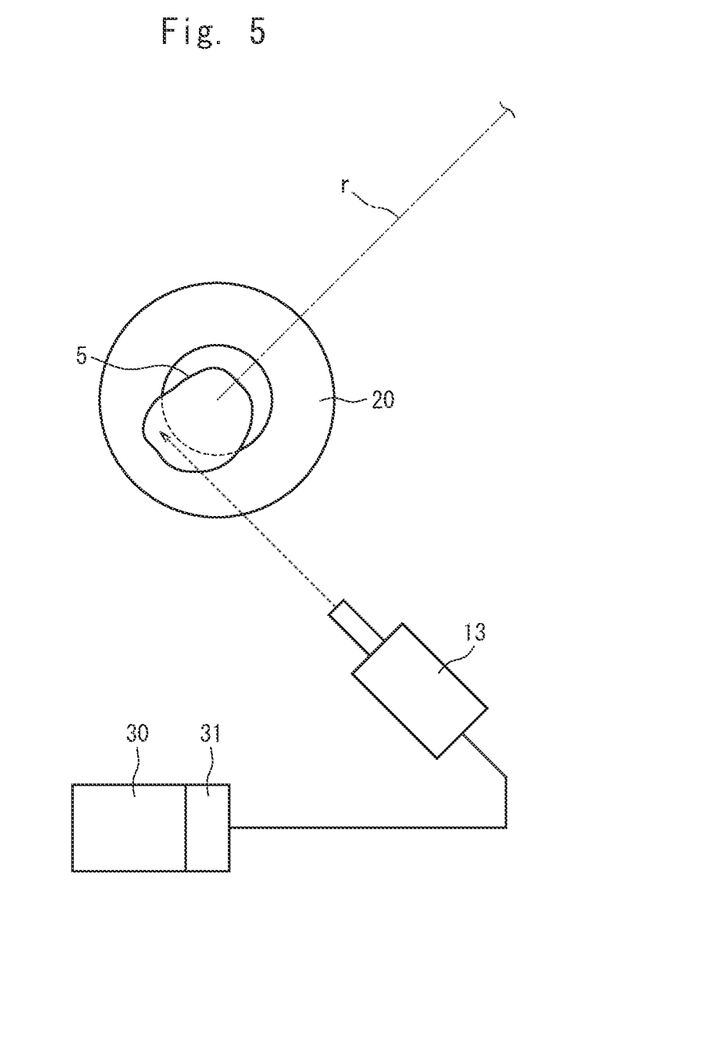
FIG. 5 is a plan view showing an arrangement of an infrared thermometer.

An infrared thermometer (radiation thermometer) 13 is arranged on slightly the downstream of the position B where the molten resin mass 5 is handed over. The infrared thermometer 13 is capable of measuring the temperature of an object without in contact therewith. The portion to be measured by the infrared thermometer 13 is in a section (track) after at least the molten resin mass 5 is handed over to the female mold 20 at the hand-over position B but before the female mold 20 is closed by the male mold. In this embodiment, the measurement is taken at the portion outside of the allowable range in a state where the molten resin mass 5 is deviated from its normal position, the measurement being taken from just over thereof or from over and tilted thereof. Concretely speaking, as shown in FIG. 5, the infrared thermometer is directed to the outer side of the forming hole 28 of the female mold 20 or to the surface of the female mold 20 at a portion on the outer side of the forming hole 28 in the radial direction thereof.

The infrared thermometer 13 is connected to a decision unit 31 in a control unit 30 for deciding the presence of the molten resin mass 5. The decision unit 31 decides the presence of the molten resin mass 5 at the above portion relying on a temperature difference between the female mold 20 and the molten resin mass 5. The control unit 30 controls the expansion units 16 that expand, the compression-forming machine 4, the preform takeout device 6 and the takeout conveyer (PF equalizer) 7 on the downstream of the compression-forming machine 4 shown in FIG. 1, the stretch-blow-forming machine 9 and the product takeout device 10.

Next, described below is the action of the embodiment of the invention.

The extruder 2 conveys a molten resin formed by heating, melting and kneading synthetic resin materials such as polyethylene terephthalate and the like to the screw 8. To feed the molten resin maintaining stability, the screw 8 is so constituted as to eject the molten resin by the gears that are in mesh. The screw 8 conveys the molten resin to the die head 24 facing downward shown in FIG. 2 through the conduit 2a, and the die head 24 continuously extrudes the molten resin formed in nearly a cylindrical shape downward through the extrusion port 25 formed in the lower end thereof.

When the holder unit 17 conveyed along the rotary track arrives at the resin-holding position A, the molten resin that is extruded is cut by the cutter 26 into the molten resin mass 5 of a predetermined size. The molten resin mass 5 that is cut is held by the holders 22 of the holder unit 17 whereby oligomer and the like that are the components contained therein adhere and deposit on the surfaces of the holders 22.

The holder unit 17 moves along the rotary track while holding the molten resin mass 5, arrives at just before the hand-over position B of the compression-forming machine 4, and moves following the circular track of the female mold 20.

If closely described with reference to FIG. 6, the cam follower 15a of the rocker unit 15 of the rotary moving-type resin-feeding device 3 is capable of moving along the groove 18. As the rocker unit 15 rotates, the cam follower 15a that is integral with the expansion unit 16 on the proximal end side thereof, while moving along the groove 18, approaches the female mold 20 of the compression-forming machine 4 that is rotating. Before and after the hand-over position B, the holder unit 17 at the distal end of the expansion unit 16 moves following the circular track of the female mold 20. In this state, the molten resin mass 5 is fed from the holder unit 17 to the normal position in the forming hole 28 of the female mold 20.

However, if oligomer and the like are depositing on the inner surfaces of the holders 22 as described above, then the time of fall of the molten resin mass 5 or the attitude varies causing such a trouble that the molten resin mass 5 cannot be fed into the female mold 20 at its normal position.

In this embodiment, the infrared thermometer 13 is disposed on the downstream of the hand-over position B. The infrared thermometer 13 is measuring the periphery on the outer side of the forming hole 28 of the female mold 20 in the radial direction of rotation thereof. The temperature of the female mold 20 is about 30° C. to about 40° C. at a point where it has just passed over the hand-over position B while the temperature of the molten resin mass 5 is as high as about 280° C. creating a large temperature difference. Therefore, if the temperature for distinguishing the molten resin mass 5 that is deviated from the forming hole 28 is set to be, for example, 100° C., then it is allowed to decide that the defectively handed over position is detected in case the infrared thermometer 13 has detected a temperature of not lower than 100° C. Since the infrared thermometer 13 measures the infrared rays from just above the female mold (metal mold) 20 or from the above and tilted thereof, detection can be made not only when the molten resin mass 5 is adhering to the outer circumferential surface of the forming hole 28 of the female mold 20 but also when only the upper portion of the molten resin mass is deflecting outward from the forming hole 28.

The infrared thermometer 13 may continuously measure the temperature or may measure the temperature at a timing of when the female mold 20 is passing by. The pitch between the female molds 20 is, usually, about 100 ms and, therefore, the infrared thermometer 13 must have a response speed quicker than the pitch between the female molds 20.

The portion where the infrared thermometer 13 measures the temperature is deflected to be on the outer side of the forming hole 28 in the radial direction of rotation of the female mold 20 on account of the reasons described below. Namely, in case the position becomes defective where the molten resin mass 5 is handed from the holder unit 17 over to the female mold 20, this defect occurs without exception on the outer side of the forming hole 28 being deviated outward in the radial direction from the center of rotation of the female mold 20.

Though it has not been clarified yet why the molten resin mass 5 deviates outward in the radial direction of the female mold 20, it is considered the following reasons are probable.

Figure 6:
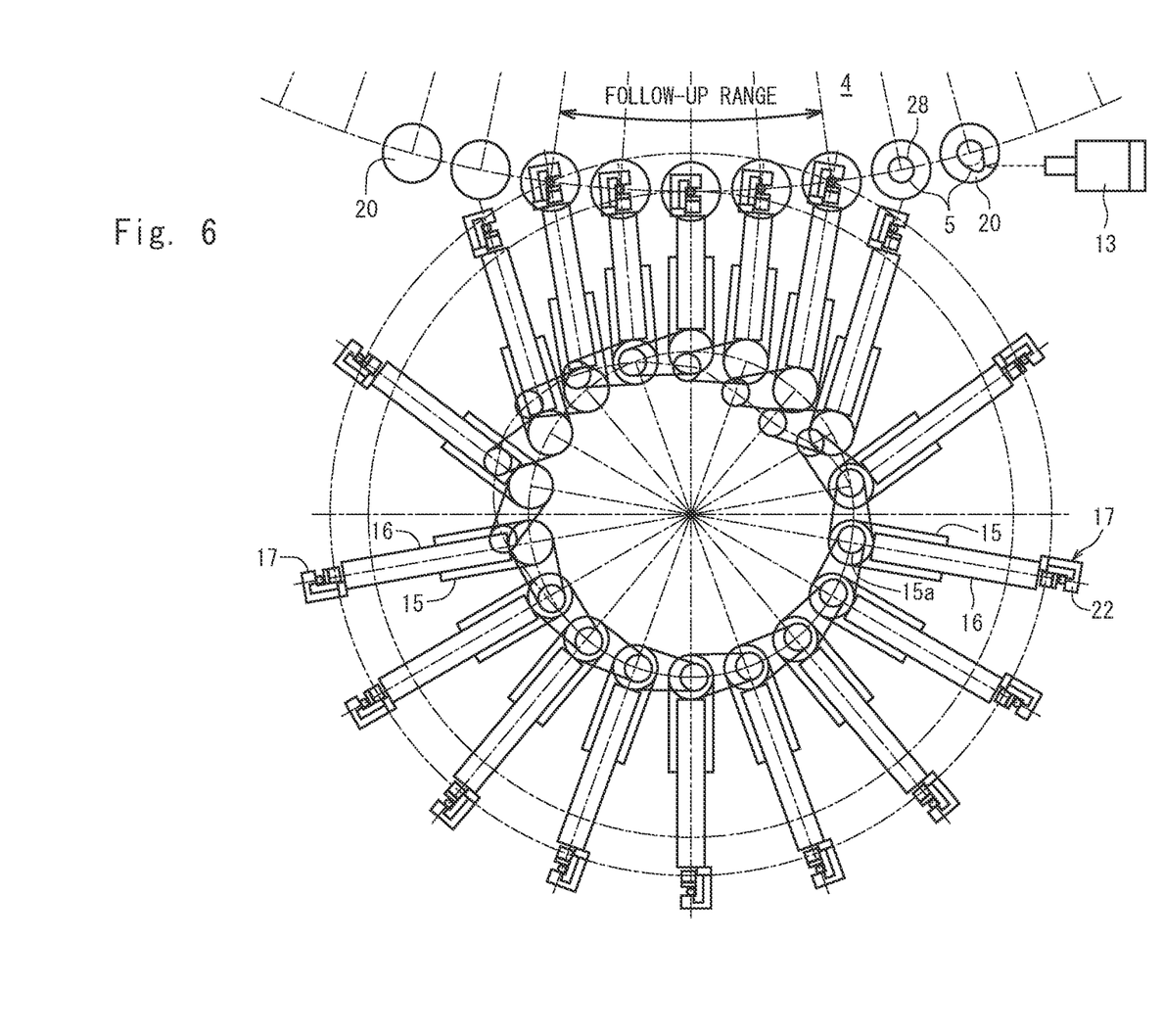
FIG. 6 is a plan view illustrating the operation of expansion units of the molten resin mass-feeding device in the compression-forming system of FIG. 1.

With reference to FIG. 6, before and after the hand-over position B, the holder unit 17 is driven along the circular track of the female mold 20 as the cam follower 15a is restricted by the track of the groove 18. In case the molten resin mass 5 is thrown down at a delayed timing from the holder unit 17 into the female mold 20, the molten resin mass 5 is thrown into the forming hole 28 of the female mold 20 in a state like when the holder unit 17 is out of the circular track of the female mold 20. Therefore, the expansion unit 16, at a position away from the circular track of the female mold, rocks in the direction opposite to the female mold and it is considered that the molten resin mass 5, too, deviates outward of the forming hole 28 (outward in the radial direction of the female mold) out of the circular track of the female mold 20.

Accordingly, the direction in which the molten resin mass 5 deviates often varies depending on a difference in the structure of the device. Depending on the device, therefore, the portion to be measured by the infrared thermometer 13 is often changed.

If the decision unit 31 decides that the molten resin mass 5 as measured by the infrared thermometer 13 is out of the normal position of the female mold 20, the control unit 30 works to contract the expansion unit 16 of the molten resin mass-feeding device 3. With the expansion unit 16 being contracted, the holder unit 17 at the end of the expansion unit 16 fails to reach the extrusion port 25 at the molten resin mass-holding position A. Thereafter, therefore, the molten resin mass 5 is not fed to the holder unit 17 (the switching technology for expanding the expansion unit has been disclosed in International Publication WO2007/034845A1).

The control unit 30, on the other hand, specifies the final holder unit 17 of the holder units 17 that are holding the molten resin masses 5 already, and causes all of the molten resin masses 5 held by the holder units 17 to be successively supplied to the female molds 20. The compression-forming machine 4 continues the compression forming until the compression forming and cooling are finished for up to the last molten resin mass 5 that is normally handed over. The operation of the compression-forming machine 4 is then brought into a halt. On the downstream of the compression-forming machine 4, the preforms are further flown into the preform takeout device 6, takeout conveyer (PF equalizer) 7, stretch-blow-forming machine 9, and product takeout device 10, and are blow-formed into the products. Therefore, the molten resin masses 5 fed into the female molds 20 at their normal position are all formed into the products.

After the operation of the compression-forming machine 4 has been halted, the molten resin masses 5 that were fed out of their normal position are left to solidify and are, thereafter, removed from the forming holes 28 and from the peripheries thereof. The compression-forming machine 4 is now ready to be operated again. If it is not desired that the molten resin at the normal position, which were fed following the molten resin mass that were fed out of their normal position on the female mold 20, are formed into the products, then these molten resin masses can be easily removed at one time.

According to the present invention as described above, only one infrared thermometer 13 is installed to decide if the molten resin masses 5 are fed to the female molds 20 at their normal positions. Namely, there is no need of installing the temperature sensors by a number equal to the number of the plurality of metal molds, and the facility cost can be decreased.

Further, in case the molten resin mass 5 is fed to the female mold 20 being deviated from the forming hole 28, the operation is continued until the molten resin masses 5 fed to the other metal molds are formed into the preforms of a desired shape making it possible to resume the productive state in an early time and to decrease the waste of the material.

For the holder units 17 that could not feed the molten resin masses to their normal positions, the holders 22 are cleaned to remove the oligomer to prevent the occurrence of defective positioning.

Though an embodiment of the invention was described above in detail with reference to the accompanying drawings, it should be noted that the invention is in no way limited to the above embodiment only and can be modified or varied in a variety of other ways without departing from the scope of the invention.

Though the above embodiment has used only one infrared thermometer 13, two or more of them may be used to decide the presence of the molten resin mass 5. For instance, the temperature may be measured at two spots on the inner side or the outer side of the radius of rotation of the forming hole 28 in the female mold 20.

In this embodiment, further, the molten resin mass 5 was fallen down from the holder unit 17 into the female mold 20. Likewise when the molten resin mass 5 is to be fed into the male mold, the presence of the molten resin mass 5 may be decided by measuring, by using the infrared thermometer, the temperature at a portion out of the allowable range of the normal positions of the male molds.

Though the above embodiment has dealt with the case of forming the preforms by using the compression-forming machine, it is also possible to apply the invention to a compression-forming machine that directly forms containers and the like.

DESCRIPTION OF REFERENCE NUMERALS

1 compression-forming system
2 extruder
3 molten resin mass-feeding device
4 compression-forming machine
13 infrared thermometer (molten resin mass position detector: temperature sensor)
14 rocker cam
15a cam follower
16 expansion units
17 holder units
20 female molds (metal molds)
25 extrusion port
28 forming hole
30 control unit
31 decision unit

The invention claimed is:

1. A compression-forming system comprising an expansion unit equipped with holding portions for holding molten resin masses, a compression-forming machine equipped with female molds which are conveyed on a circular track, a single temperature sensor and a control unit, wherein said single temperature sensor measures the temperature of a periphery on an outer side of a forming hole of the female mold in a radial direction of rotation of the female mold obliquely from above the female mold in the direction of the rotation, said single temperature sensor measures the temperature of a portion on the outer side of an allowable range in which the molten resin masses are fed to the female molds, said control unit carries out judgment of the presence of the molten resin masses on said portion on the outer side of an allowable range by the temperature of said portion to detect that the molten resin masses are defectively handed over, carries out expansion control of said expansion unit and carries out operation control of said compression-forming machine, and said control unit discontinues the extrusion of the molten resin from the extrusion port to the holding portions and the control unit works to contract the expansion unit if it is decided that the molten resin mass is on the outer side of the allowable range, and brings the compression-forming system to a halt after the molten resin masses still remaining in the holding portions are all handed over to the female molds and formed into a predetermined shape.

2. The compression-forming system according to claim 1, wherein said temperature sensor is an infrared thermometer of the non-contact type.

3. The compression-forming system according to claim 1, wherein said female molds are conveyed along a circular track, said holding portions are conveyed along a circular track revolving reversely to the female molds, and said holding portions being so conveyed as to hand the molten resin masses over to the female molds at a portion where said molten resin masses are to be handed to the female molds following up the circular track of said female molds.

* * * * *